United States Patent [19]
Bell et al.

[11] Patent Number: 5,613,133
[45] Date of Patent: Mar. 18, 1997

[54] MICROCODE LOADING WITH CONTINUED PROGRAM EXECUTION

[75] Inventors: Michael Bell, Glen Mills; William Burroughs, Exton; Susanne Gilliam, Radnor; William Holman, Coatesville, all of Pa.

[73] Assignee: Unisys Corporation, Blue Bell, Pa.

[21] Appl. No.: 303,493

[22] Filed: Sep. 9, 1994

[51] Int. Cl.$^6$ ............................ G06F 9/26; G06F 9/18
[52] U.S. Cl. ............................................ 395/712
[58] Field of Search ......................... 395/775, 375, 395/700

[56] References Cited

U.S. PATENT DOCUMENTS 4,204,252  5/1980  Hitz et al. ............................ 395/775
4,422,144  12/1983  Johnson et al. ...................... 395/375
5,278,973  1/1994  O'Brien et al. ...................... 395/500
5,511,195  4/1996  Kennedy, Jr. et al. ................ 395/650

*Primary Examiner*—Jack B. Harvey
*Assistant Examiner*—Jeffrey K. Seto
*Attorney, Agent, or Firm*—John B. Sowell, Att.; Mark T. Starr, Att.; John F. O'Rourke, Att.

[57] ABSTRACT

Microcode is loaded into, for example, a processor or I/O module within a computer system without manually halting and restarting the computer system. In other words, microcode can be loaded into the computer system dynamically while data processing continues from the processor or I/O module states just prior to the microcode load with no major interruption to the user. A microcode image is loaded into a processor which is already executing one or more tasks. A request to load microcode into the processor is received. The processor is signalled to suspend task execution. After the microcode image is transferred into the processor, the processor is signalled to resume task execution.

20 Claims, 6 Drawing Sheets

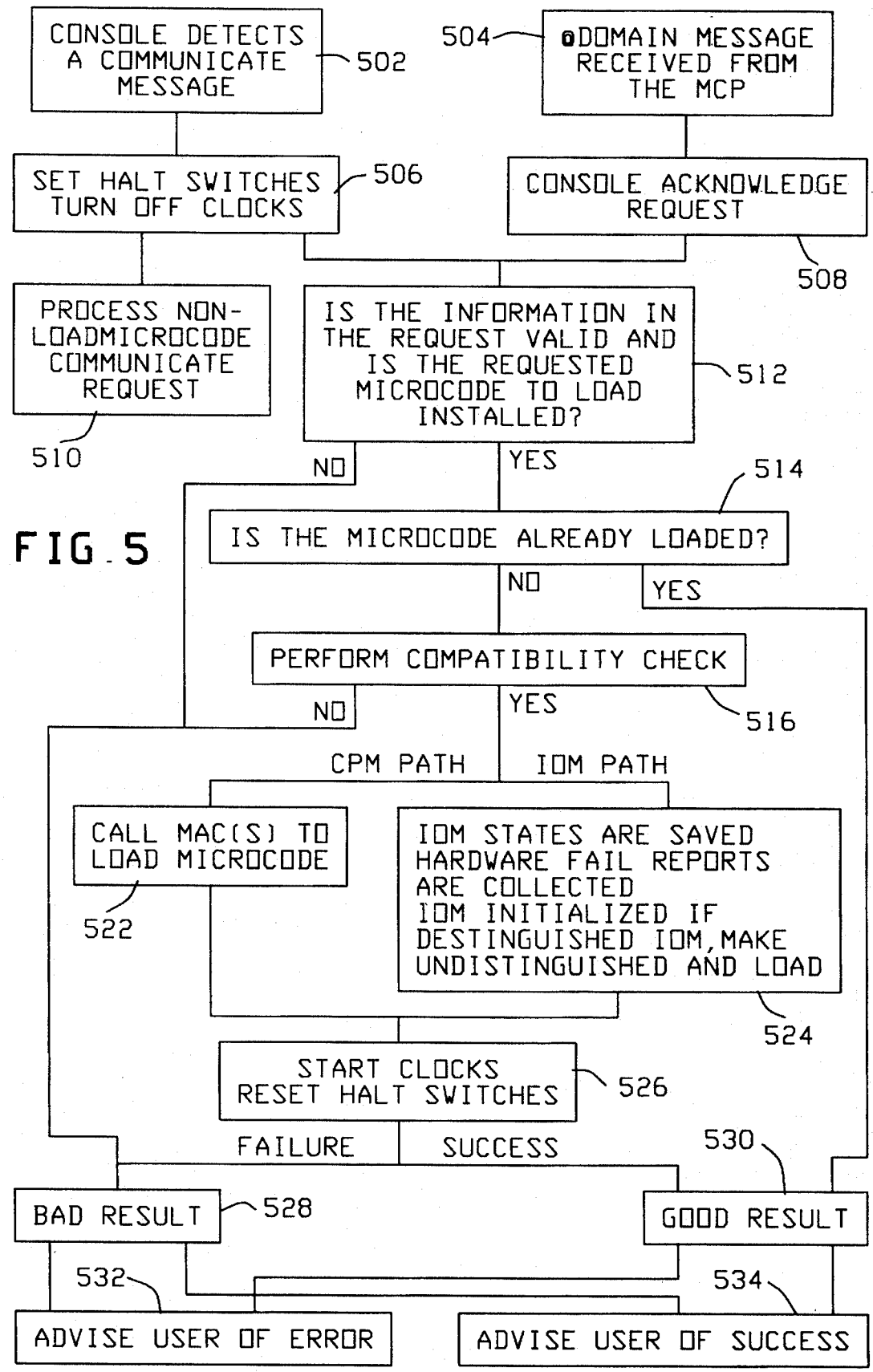

MICROCODE LOADING WITH CONTINUED PROGRAM EXECUTION

FIELD OF THE INVENTION

This invention is in the field of computer systems. In particular, a computer system and method are disclosed in which microcode may be loaded into a processor or I/O module without halting or restarting the computer system and with continued program execution.

BACKGROUND OF THE INVENTION

Modern computer systems are comprised of a plurality of processors, each performing dedicated functions. By using multiple processors, improved throughput is obtained.

A block diagram which illustrates the modularity of a modern computer system is set forth in FIG. 1. Computer system 100 illustrates a computer system architecture which may apply, for example, to an A16 mainframe (manufactured by Unisys Corporation, Blue Bell, Pa.). As illustrated by FIG. 1, the plurality of processors may be segregated into two separate partitions, with first domain 120 occupying one partition and second domain 130 occupying another partition. In this way, each partition is able to independently execute isolated tasks.

In some computer systems, multiple segregated processors (i.e. multiple domains) may be included in each partition for higher levels of independent but concurrent processing. Alternatively, if required, the two partitions can be combined to intercommunicate for processor intensive task execution. As a further alternative, first domain 120 may exist with second domain 130 deleted.

For simplicity, the components within computer system 100 will be described with regard to first domain 120. However, it is understood that many of the components found in first domain 120 are also found in second domain 130 (if second domain 130 is included).

A central processing module (CPM) 122 is responsible for many types of code execution. As one example, CPM 122 executes the operating system—referred to as the Master Control Program (MCP). Each program executed by CPM 122 performs separate procedures, referred to as "tasks".

Terminal 160 receives user instructions (for example, through a keyboard) and transfers the user instructions to the MCP being executed by CPM 122. Results of various tasks being executed by CPM 122 are communicated to the user by terminal 160.

Input/output module (IOM) 124 coordinates input/output (I/O) operations. IOM 124 is comprised of a plurality of units which coordinate I/O operations. One type of unit included in IOM 124 is input/output unit (IOU) 141. IOU 141 performs high level I/O functions such as the scheduling of I/O jobs, the selection of data paths over which I/O jobs are performed, the gathering of job statics and the management of I/O devices. Another type of unit included in IOM 124 is task control unit (TCU) 142. TCU 142 provides allocating and de-allocating of events, maintaining the status of tasks running on the system, performing of task priority computations and scheduling the execution of tasks.

For simplicity, CPM 122 and IOM 124 (and any other central processing modules and I/O modules in computer system 100) will each be referred to as requestors.

Memory storage module (MSM) 128 includes various memory components where program code and data may be stored. CPM 122 is able to communicate with MSM 128. Thus, for example, CPM 122 executes program code (e.g. the code for the MCP) stored in MSM 128. In addition, IOM 124 is able to communicate with MSM 128. Each requestor includes a memory cache to facilitate data storage and retrieval operations with MSM 128.

State access module (SAM) 126 provides host maintenance logic. SAM 126 is capable of viewing the state of CPM 122, IOM 124, and MSM 128.

Console (or coprocessor) 150 is coupled to each module (CPM 122, IOM 124, SAM 126 and MSM 128). Console 150 displays the state of each module and the state of MSM 128. Console 150 also invokes software routines—maintenance access commands (MACs)—which are executed by SAM 126 for providing data transfer functions to or between console 150 and requestors.

In accordance with the prior art, CPM 122 and IOM 124 include modularized hardware architectures which are capable of performing data processing. However, as is well known in the art, such hardware architectures perform processing responsive to microcode loaded therein. The loaded microcode directs the hardware to perform the transfer of data between various internal components (e.g. processors, requestors, memory, registers, etc.) according to predetermined timing sequences.

The ability to alter microcode within CPM 122 or IOM 124 facilitates modification of the operation of CPM 122 and IOM 124. Put another way, should a modification in the operation of CPM 122 and IOM 124 be desired, expensive hardware modifications are typically not necessary. All that is required is to load different microcode into these devices.

In accordance with the prior art, it is common for computer systems to stop processing and come to a complete halt in order to load new microcode. After restarting the system, tasks that were interrupted at the time of system halt typically cannot simply "resume" execution at the point of interruption. Instead, tasks may be started from their respective beginnings with their previous results (or intermediate results) lost. Thus, downtime of the computer system is required with a significant impact on system productivity. Furthermore, interrupted tasks may require complete re-execution.

For example, many computer systems may have hundreds of tasks currently in various stages of execution. The complete stoppage of such a computer system is a significant inconvenience and major expense to the users of such systems. Furthermore, after the new microcode has been loaded, either a system re-boot or special types of re-configuration action are required. This may be significantly time consuming and require the use of expensive engineering resources.

Various system reconfigurations may be attempted to load new microcode without incurring the aforementioned difficulties. Such reconfigurations are tedious to implement and often not successful.

SUMMARY OF THE INVENTION

A microcode image is loaded into a processor in a computer system which is already executing one or more tasks. A request to load microcode into the processor is received. The processor is signalled to suspend task execution. After the microcode image is transferred to the processor, the processor is signalled to resume task execution. Thus, a microcode image is loaded into the processor dynamically while data processing continues with no major interruption to the user. Furthermore, following the loading of the microcode, task execution may continue from the point of execution prior to the microcode load.

BRIEF DESCRIPTION OF THE FIGURES

FIG. 5 is a flow chart diagram which is useful for explaining the operation of both the first and the second exemplary embodiments of the present invention.

DETAILED DESCRIPTION OF THE INVENTION

The present invention provides a reliable process for loading microcode into, for example, a processor or I/O module in a computer system without manually halting the computer system and without reinitiating executing tasks which were interrupted by the microcode load. In other words, microcode can be loaded into the computer system dynamically while processing continues with no major interruption to the user. This process of dynamically loading microcode is referred to as live domain microcode loading.

Figure 2:
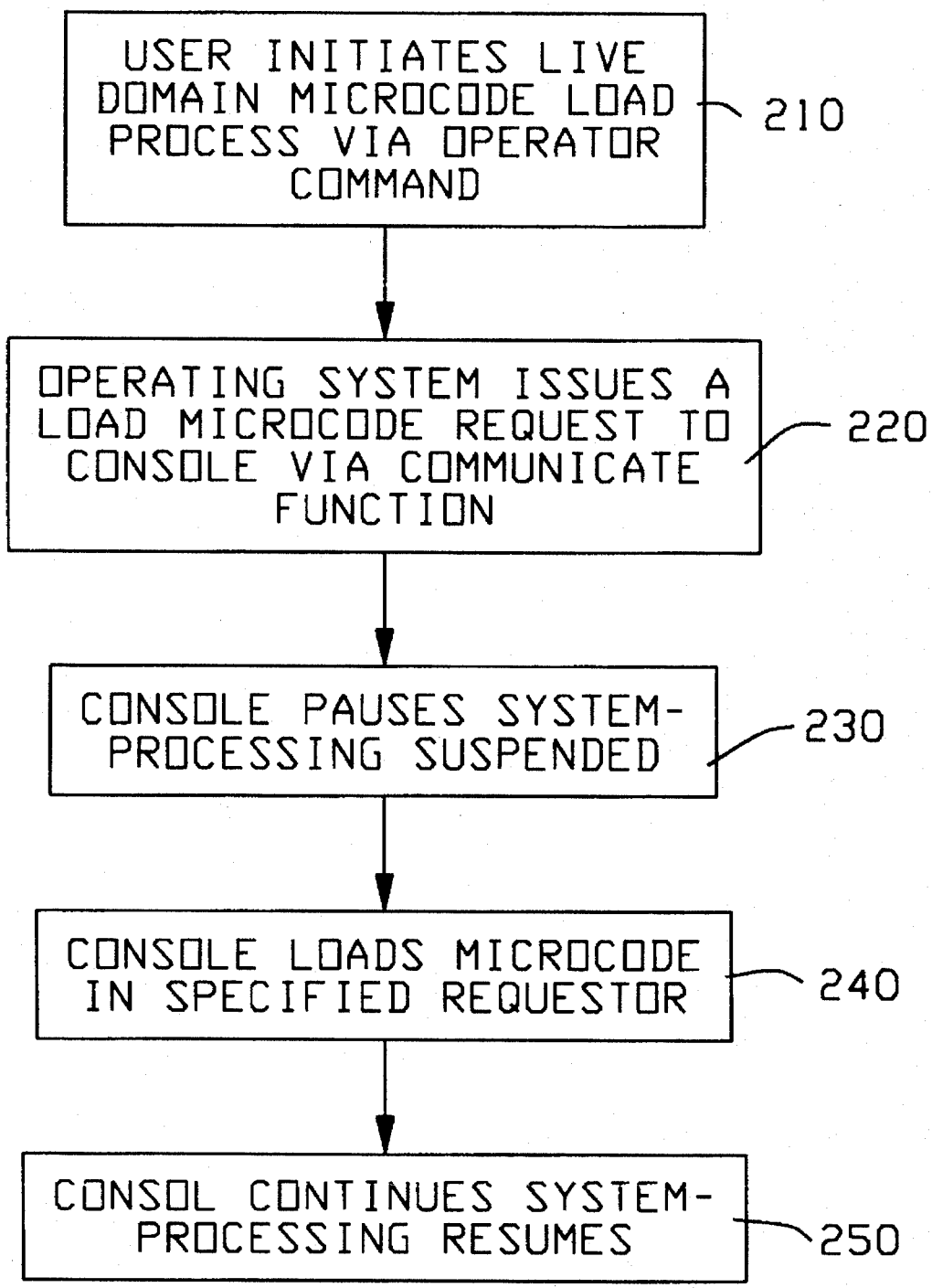
FIG. 2 is flow chart diagram which is useful for providing a generalized explanation of the operation of a first exemplary embodiment of the present invention.

The operation of a first exemplary embodiment of the present invention is generally illustrated by FIG. 2. The first exemplary embodiment of the present invention is intended for live domain microcode loading of a single requestor in a computer system. This embodiment is applicable when there is only one requestor (i.e. physically on the system or in use) that is to receive the microcode load.

As shown in FIG. 2, step 210, a user initiates the process of live domain microcode loading through the use of an operator command. This typically occurs by the user typing the appropriate request into terminal 160. In response to the operator command, at step 220, the operating system transmits appropriate signals so that console 150 is advised of the user's live domain microcode Loading request. At step 230, the console transmits appropriate signals to all of the requestors in computer system 100 to suspend task execution. At step 240, console 150 loads the microcode into the appropriate requestor. Finally, at step 250, console 150 signals all of the requestors in computer system 100 to resume task processing.

Figure 3:
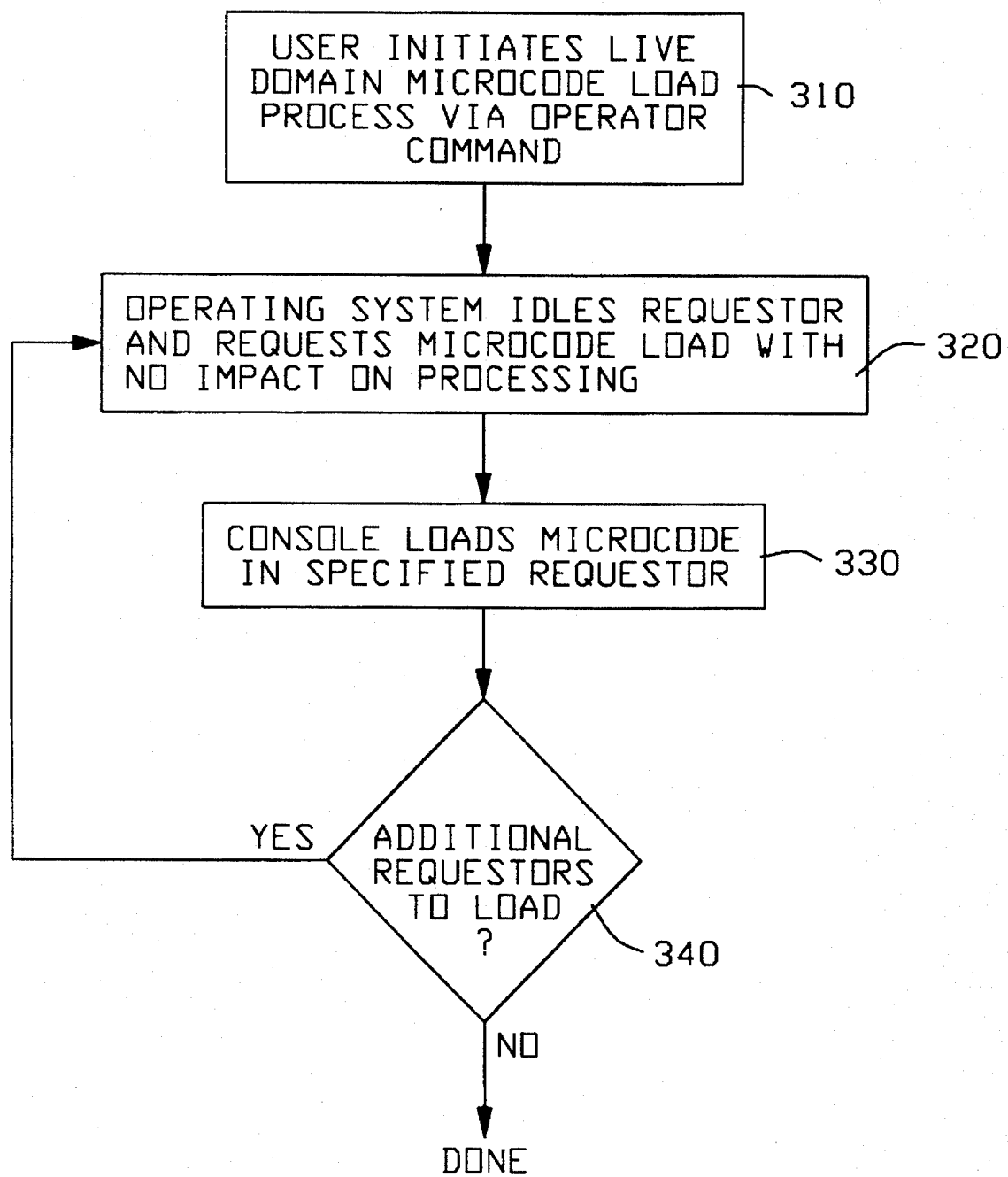
FIG. 3 is flow chart diagram which is useful for providing a generalized explanation of the operation of a second exemplary embodiment of the present invention.

A second exemplary embodiment of the present invention is generally illustrated by the flow chart diagram of FIG. 3. The second exemplary embodiment of the present invention is intended for live domain microcode loading of multiple requestors in a computer system.

As shown in FIG. 3, step 310, the user initiates the process of live domain microcode loading with an operator command. This typically occurs by the user typing the appropriate request into terminal 160.

Depending on the requestor that is to receive the microcode load, the operating system idles the requestor and transmits an appropriate signal to console 150 indicating that a microcode load is requested. At step 330, the microcode is transferred from the console to the specified requestor. At step 340, it is determined if further requestors require live domain microcode loading. If an additional requestor requires live domain microcode loading, then execution is transferred again to step 320. If there are no further requestors that require live domain microcode loading, then the loading sequence is terminated.

Both exemplary embodiments may include the step of advising the user of the completion of the requested live domain microcode loading.

Figure 1:
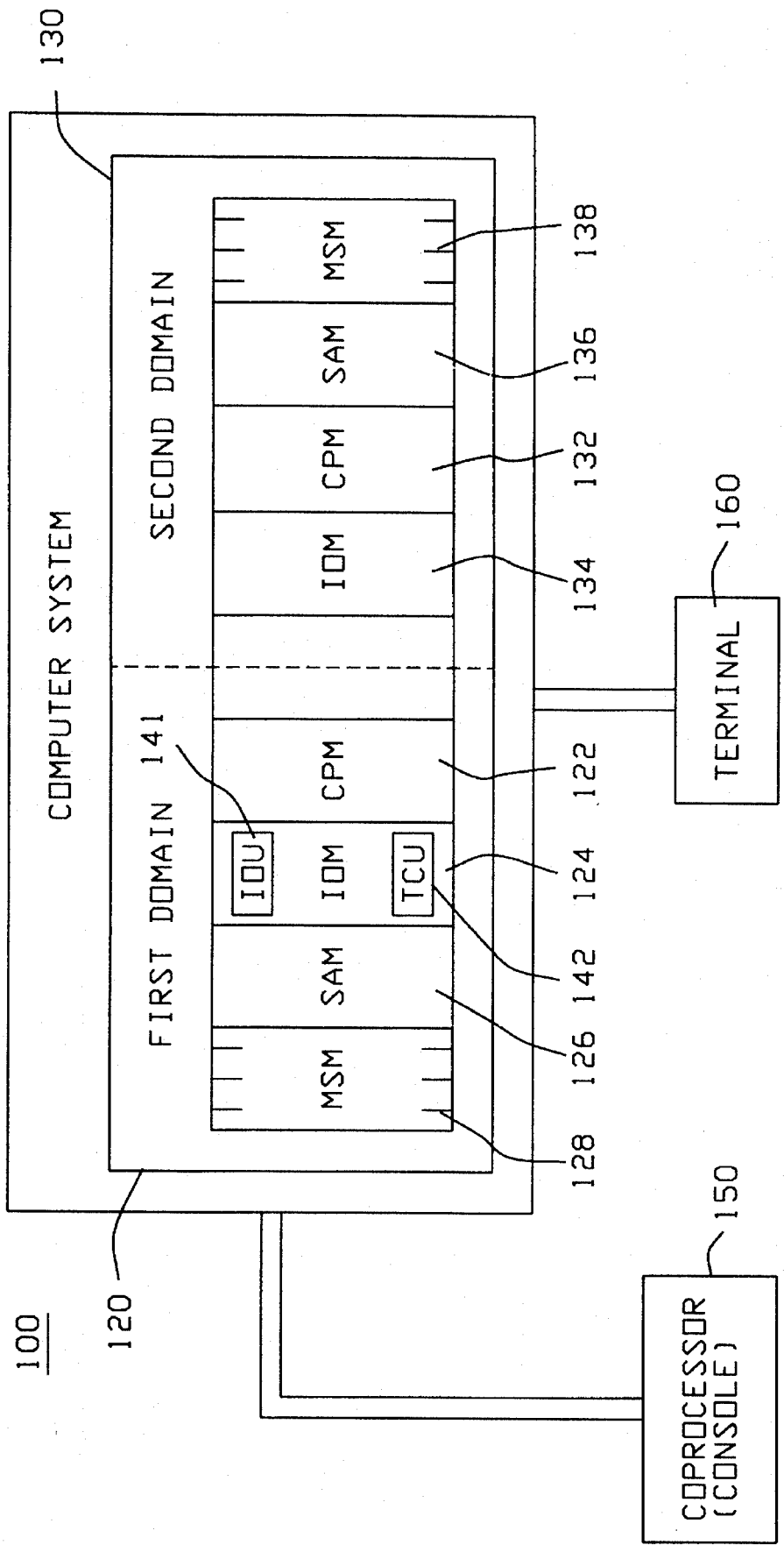
FIG. 1 is a block diagram of a computer system in accordance with the prior art.
Figure 4A:
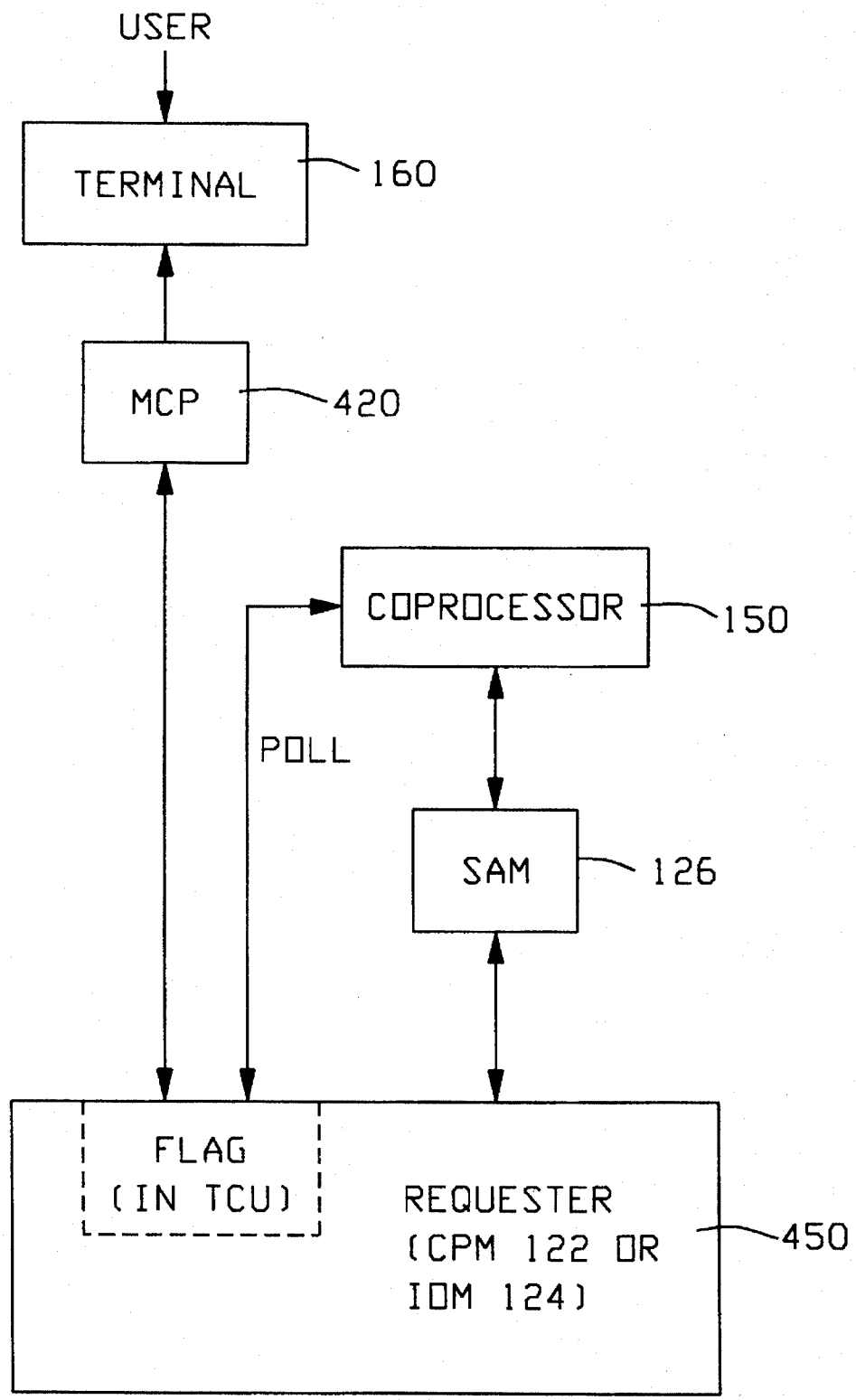
FIG. 4a is a block diagram which illustrates the transfer of data and signals between various hardware and software components in accordance with the first exemplary embodiment of the present invention.
Figure 4B:
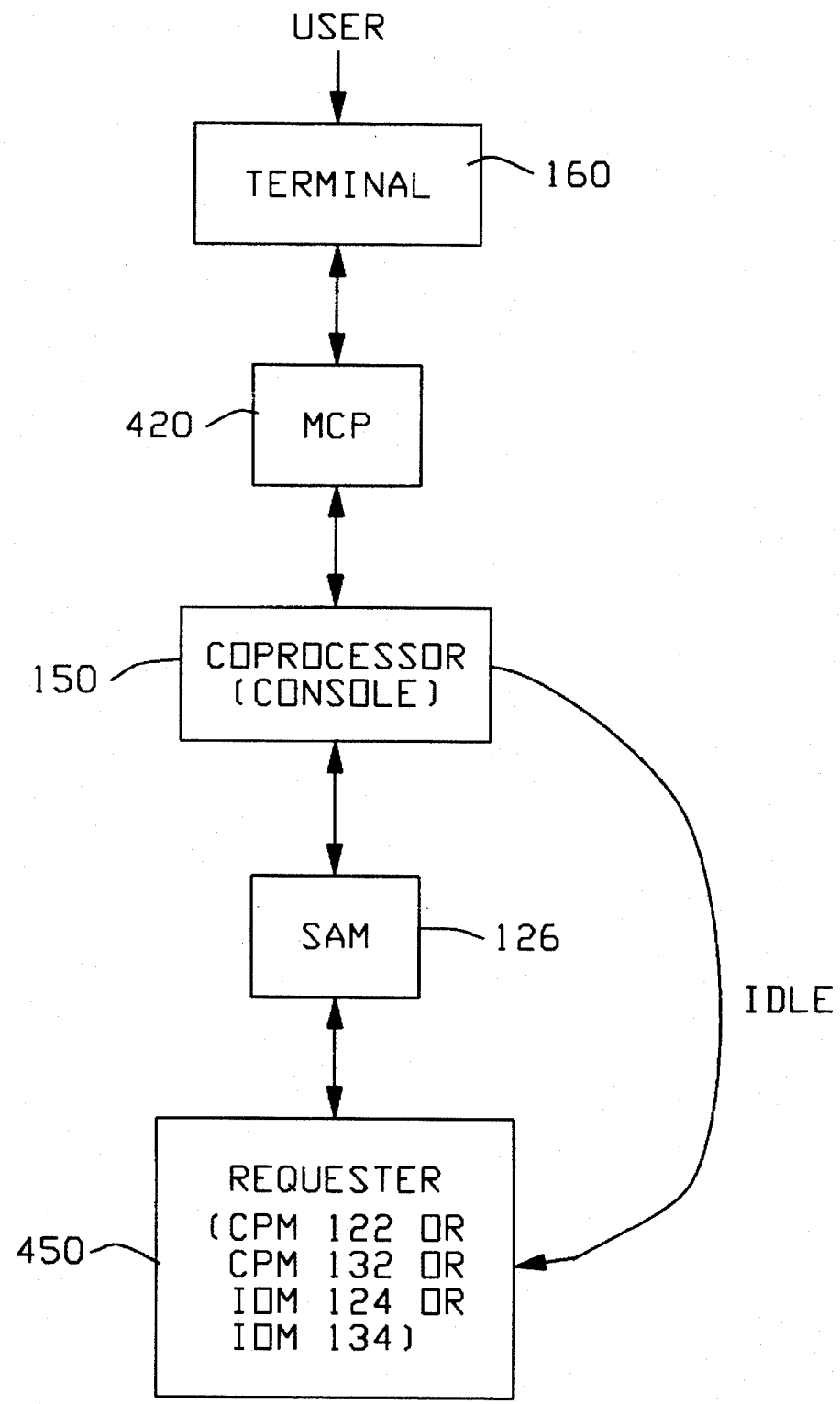
FIG. 4b is a block diagram which illustrates the transfer of data and signals between various hardware and software components in accordance with the second exemplary embodiment of the present invention.

Appropriate hardware and software structures which implement exemplary embodiments of the present invention are logically shown in FIG. 4a and FIG. 4b. FIG. 4a and FIG. 4b each include components included in FIG. 1. These components are rearranged and shown with additional components for explanatory purposes. FIG. 4a is intended to illustrate the operation of the flow chart diagram which is included in FIG. 2. FIG. 4b is intended to illustrate the operation of the flow chart diagram which is included in FIG. 3.

As shown in FIG. 4a, terminal 160 is capable of receiving appropriate commands from the user. In accordance with the present invention, the user indicates that live domain microcode loading is desired.

Thus, the user may enter a load microcode command. The command includes the type of requestor (i.e. CPM or IOM) to load and the version of microcode to load. Terminal 160 transmits the user's request to load microcode to the master control program 420 (i.e. the operating system being executed from MSM 128 by CPM 122). Upon receipt of the user's load microcode request from terminal 160, MCP 420 communicates with the requestor to ensure that the requestor is in a suitable state for halting. For example, in the case of IOM 124, MCP 420 communicates with IOM 124 to ensure that IOM 124 is not in actively in the middle of an I/O operation. Upon MCP 420 ensuring that the requestor is in a suitable state for halting, MCP 420 sends a message to TCU 142 requesting that TCU 142 set an internal flag.

Console 150 routinely polls the flag register within TCU 142. Upon determining that the flag within TCU 142 is set, console 150 begins to process the user's live domain microcode loading request as more clearly set forth below.

Console 150 desirably first invokes appropriate MACs to turn off all system clocks within computer system 100.

Console 150 then performs Memory Updating. Memory Updating is performed as follows.

To maintain data integrity, it is desirable to ensure that the memory space in MSM 128 includes all of the contents of the memory cache of requestor 450 prior to microcode load. Thus, console 150 transfers the contents of the cache of requestor 450 into the corresponding memory space in MSM 128.

Next, console 150 makes several determinations including a) whether the flag within TCU 142 was set responsive to user's live domain microcode loading request (the flag may have other functions), b) whether the user's request is valid, c) whether the microcode which the user wishes to load is stored in console 150 (where microcode for live domain microcode loading requests is desirably stored), d) whether the microcode which the user wanted loaded into requestor 450 is compatible with microcode which has been running on computer system 100, and e) whether the microcode which the user wishes to load has already been loaded into requestor 450.

If the flag within TCU 142 was not set as a result of a live domain microcode loading request, other action as appropriate is taken. If there is a problem with request validity, microcode availability, microcode compatibility, or if the microcode is already in the requestor, an appropriate message (e.g. an error message) is created, the console signals the idled requestors in computer system 100 to resume processing, and MCP 420 provides the user with a message identifying the condition.

If the appropriate conditions outlined above are met, console 150 invokes and SAM 126 executes appropriate MACs to transfer the appropriate microcode from console 150 to SAM 126. As the microcode is transferred to SAM 126, the MACs executed by SAM 126 transfer and load the microcode into requestor 450.

After completing the loading of the live domain microcode into requestor 450, the MACs executed by SAM 126 transmit a message to console 150 indicating the completion (and the success or failure) of the microcode load. Console 150 then invokes appropriate MACs which are executed by SAM 126 to signal CPM 122 and IOM 124 to resume task execution. With CPM 122 again enabled, MCP 420 is again enabled. Thus MCP can again assume its supervisory role. MCP 420 informs the user via terminal 160 that processing is complete.

The block diagram of FIG. 4b illustrates an alternative manner of loading live domain microcode into a requestor. However, the embodiment shown in FIG. 4b is intended for the loading of microcode into multiple requestors.

In accordance with the present invention, the user indicates that live domain microcode loading is desired. Thus, the user may enter a load microcode command which includes the type of requestor to receive the microcode load and the version of microcode to be loaded. Terminal 160 transmits the user's request to load microcode to the master control program 420 (i.e. the operating system being executed from MSM 128 by CPM 122). Upon receipt of the user's load microcode request from terminal 160, MCP 420 performs several operations. One operation performed by MCP 420 in this embodiment is, based on the type of requestor specified by the user, to evaluate a list of requestors to determine the specific requestor which is to be loaded with the microcode. Another operation performed by MCP 420 is to idle the specific requestor for which the loading of live domain microcode is being attempted. With regard to FIG. 4b, the loading of live domain microcode load is being attempted for requestor 450 (i.e. CPM 122, CPM 132, IOM 124, IOM 134). The idling of a requestor is explained below.

If CPM 132 is the requestor that is being idled (i.e. requestor 450), MCP 420 signals TCU 124 that CPM 132 is being idled. TCU 124 then signals CPM 132 to stop processing (i.e. in a stack machine, for CPM 132 to stop processing the stack currently being processed by CPM 132). CPM 132 is then instructed to go into an "idle" mode (i.e. to not execute further code) until further instructions are received. TCU 124 then signals CPM 122 that CPM 132 has been idled. In response, CPM 122 removes CPM 132 from a list of available requestors. In this way, no further tasks will be assigned by computer system 100 to CPM 132 until the loading of microcode into CPM 132 has been completed.

MCP 420 next directs CPM 122 (the non idle CPM) to perform Memory Updating. Memory Updating is performed in the manner described with reference to FIG. 4a.

MCP 420 then sends a message to the console 150 requesting live domain microcode loading. If the conditions generally described above with reference to FIG. 4a are not met (e.g. request validity, microcode availability, microcode compatibility, microcode already in the requestor), then the microcode load attempt is terminated with an appropriate message (e.g. an error message) from console 150 to MCP 420 and a subsequent message from MCP 420 to the user. Otherwise, the microcode is transferred to SAM 126, and the MACs executed by SAM 126 transfer and load the code image into requestor 450.

After completing the loading of the live domain microcode into requestor 450, the MACs executed by SAM 126 transmit a message to console 150 indicating the completion (and the success or failure) of the microcode load. Console 150 then passes this information on to MCP 420 (via an appropriate message) and MCP 420 passes this information on to the user (by a further appropriate message). Next, MCP 420 signals TCU 142 that requestor 450 is ready to accept tasks. TCU 142 begins assigning tasks to requestor 450, enables operation of requestor 450 and signals MCP 420 that requestor 450 may be assigned tasks. The entire process can then be repeated for another requestor. MCP 420 informs the user via terminal 410 when processing is complete.

Although the explanation provided above relates to the loading of microcode into any type of requestor, there are somewhat different procedures for loading microcode depending upon whether the requestor is a CPM (e.g. CPM 122) or an IOM (IOM 124).

The most significant difference between the loading of microcode in CPM 122 or IOM 124 occurs at the step of idling the requestor prior to the microcode load and readying the request after the microcode load. For purposes of this explanation, an IOM is considered to be either distinguished or undistinguished. This designation is used because, when there is more than one IOM in computer system 100 (i.e. when there are two IOMs in computer system 100), there is a TCU and IOU in each IOM. One TCU/IOU set is used to pass messages back and forth to the remaining processors in computer system 100. The remaining processors in computer system 100 need to known which TCU/IOU set is actually passing the messages. Accordingly, the IOU and TCU which are passing messages between the remaining processors are referred to as the distinguished IOU and the distinguished TCU, respectively. Each processor is advised as to which TCU is the distinguished TCU and which IOU is the distinguished IOU. Upon being appropriately advised, the remaining processors in computer system 100 use the distinguished TCU and the distinguished IOU for interprocessor message transmission.

When microcode is being loaded into the two IOMs in computer system 100, the non-distinguished IOM (i.e. the IOM that does not include the distinguished TCU and the distinguished IOU) is loaded first. After the non-distinguished IOM has been loaded, the console transfers the data held in the distinguished TCU and the distinguished IOU to the non-distinguished IOM. The non-distinguished IOM is then made into the distinguished IOM. Similarly, the distinguished IOM is then made the nondistinguished IOM. By proceeding according to the method explained above, the data stored in the originally distinguished IOM is not lost. After the data from the originally distinguished IOM is transferred to the new distinguished IOM, the microcode in the originally distinguished IOM can be updated. Thus, while initializing each IOM during the loading of the live domain microcode, data is not lost.

An alternative manner of explaining the operation of the present invention is provided by the exemplary embodiment of the present invention which is shown in FIG. 5.

Execution of the exemplary embodiment of the present invention is initiated either by steps 502 and 506 or by steps 504 and 508. Execution is initiated at steps 502 and 506 when console 150 detects a Communicate message. Communicate messages are used when there is live domain microcode loading of a single requestor in computer system 100. Execution is initiated at steps 504 and 508 when console 150 receives an @Domain message. @Domain messages are used when there is live domain microcode loading of multiple requestors in computer system 100.

Thus, at step 502, the console 150 detects that a flag within TCU 124 has been set by MCP 420 and, at step 506, turns off the clocks of each requestor. If the flag in TCU 124 does not indicate a request for a live domain microcode load, then alternative processing as appropriate is performed (step 510). Otherwise, processing proceeds to step 512.

Alternatively, at step 504, MCP 420 transmits a request directly to console 150 (in the form of an I/O request) indicating that live domain microcode loading is desired. At step 508, console 150 acknowledges the request. Processing again proceeds to step 512.

At step 512, the request for live domain microcode loading is evaluated to determine whether the request is valid and to determine if the requested microcode currently exists within console 150.

At step 514, a determination is made as to whether the live domain microcode which is desired to be loaded has already been loaded. If the live domain microcode has already been loaded, then execution is transferred to step 530 after which MCP 420 is appropriately notified. If the microcode has not already been loaded, then, at step 516, a compatibility check is made. This involves determining whether the microcode to be loaded is compatible with the type of microcode presently running on that type of requestor within the system. In an exemplary embodiment of the present invention, compatibility may be determined by evaluating the version numbers (or other appropriate identification numbers) of the presently running microcode. If the microcodes are not compatible, then execution transfers to step 528 (to indicate the problem to MCP 420).

Execution of the present algorithm then varies depending on whether the microcode is to be loaded into CPM 122 or IOM 124. If CPM 122 is to be loaded with microcode then, at step 522, the appropriate MACs are called to load the microcode. If IOM 124 is to be loaded, then, at step 524, various states in the IOM are saved, hardware fail reports are collected, the microcode is loaded and the IOM is appropriately initialized. If there is more than one IOM, then the undistinguished and distinguished IOMs are loaded with microcode in the manner previously described. At step 526, the clocks are started and the halt switches are reset. The maintenance bus which was used to load the microcode into requestor 450 is disabled.

It is then determined whether the microcode load was successful. If the microcode load was successful, execution transfers to step 530 (to indicate the good result to the MCP). Conversely, if the microcode load was not successful, then execution transfers to step 528 (to indicate the problem to MCP 420). Finally, at steps 532 and 534, the user is advised of the failure and success of the microcode load, respectively.

While the invention has been described in terms of exemplary embodiments, it is contemplated that it may be practiced as outlined above with modifications within the spirit and scope of the appended claims.

What is claimed:

1. A method of loading a microcode image into a processor in a computer system, wherein said processor is executing one or more tasks, said method comprising the steps of:

receiving a request to load microcode into said processor, signalling said processor to suspend execution of said one or more tasks;

suspending execution of said one or more tasks at respective states of said one or more tasks;

transferring said microcode image into said processor;

signalling said processor to resume execution of said one or more tasks; and resuming execution of said one or more tasks at said respective states.

2. A method of loading a microcode image into a processor in a computer system in accordance with claim 1, wherein said computer system includes a coprocessor for sending messages to said processor, and said step of signalling said processor to suspend execution of said one or more tasks includes the steps of:

signalling to said coprocessor to suspend execution of said one or more tasks; and signalling from said coprocessor to said processor to suspend execution of said one or more tasks.

3. A method of loading a microcode image into a processor in a computer system in accordance with claim 1, wherein said computer system includes an operating system for receiving said request to load microcode into said processor and wherein said operating system transmits a signal for said processor to suspend execution of said one or more tasks.

4. A method of loading a microcode image into a processor in a computer system in accordance with claim 2, wherein said coprocessor is a console, said microcode image is stored in said console and said microcode image is transferred from said console to said processor after said processor suspends execution of said one or more tasks.

5. A method of loading a microcode image into a processor in a computer system in accordance with claim 4, wherein said computer system includes a memory and said processor includes a cache memory associated with and corresponding to address space in said memory, and wherein said coprocessor transfers data from said cache memory to said memory prior to transferring said microcode image from said console to said processor.

6. A method of loading a microcode image into a plurality of processors in a computer system, wherein each of said processors is executing one or more tasks, comprising the steps of:

receiving a request to load said microcode image into said plurality of processors;

signalling a first one of said plurality of processors to suspend operation of said one or more tasks;

suspending execution of said one or more tasks executed by said first one of said plurality of processors at a first plurality of respective states;

transferring said microcode image into said first one of said plurality of processors;

signalling said first one of said plurality of processors to resume operation of said one or more tasks at said first plurality of respective states;

signalling a second one of said plurality of processors to suspend operation of said one or more tasks;

suspending execution of said one or more tasks executed by said second one of said plurality of processors at a second plurality of respective states;

transferring said microcode image into said second one of said plurality of processors; and signalling said second one of said plurality of processors to resume operation of said one or more tasks at said second plurality of respective states.

7. A method of loading a microcode image into a plurality of processors in a computer system according to claim 6, wherein said computer system includes an operating system for receiving said request to load microcode into said plurality of processors and wherein said operating transmits at least one signal to said plurality of processors to suspend execution of said one or more tasks.

8. A method of loading a microcode image into a plurality of processors in a computer system according to claim 6, wherein said microcode image is stored in a coprocessor which is coupled to said computer system and said microcode image is transferred from said coprocessor to each of said plurality of processors after each of said plurality of processors suspends execution of said one or more tasks.

9. A method of loading a microcode image into a plurality of processors in a computer system according to claim 8, wherein said coprocessor is a console, said computer system includes a memory and each of said processors includes a cache memory associated with and corresponding to address space in said memory, and wherein one of said plurality of processors transfers data from said cache memory of another one of said processors to said memory prior to said console transferring said microcode image to said another one of said processors.

10. A method of loading a microcode image into a plurality of processors in a computer system according to claim 6, wherein two of said plurality of processors are input/output (I/O) processors for coordinating I/O operations and wherein one of said two I/O processors is selected to handle message exchange between said plurality of processors while another of said two I/O processors is receiving said microcode image.

11. Apparatus for loading a microcode image into a processor in a computer system wherein said processor executes a plurality of tasks, comprising the steps of:

suspension means for suspending execution of said plurality of tasks by said processor at a respective plurality of states;

means for transferring said microcode image into said processor, and means for resuming execution of said plurality of tasks by said processor at said respective plurality of states.

12. Apparatus for loading a microcode image into a processor in a computer system according to claim 11, wherein said suspension means comprises a coprocessor for receiving a request to suspend execution of said plurality of tasks and for transmitting a signal for said processor to suspend execution of said plurality of tasks.

13. Apparatus for loading a microcode image into a processor in a computer system according to claim 11, wherein said computer system includes an operating system for receiving a request to load microcode into said processor and for transmitting a signal to said processor to suspend execution of said one or more tasks.

14. Apparatus for loading a microcode image into a processor in a computer system according to claim 12, wherein said microcode image is stored in said coprocessor, said coprocessor further including means for transferring said microcode image from said coprocessor to said processor after said processor suspends execution of said one or more tasks.

15. Apparatus for loading a microcode image into a processor in a computer system according to claim 14, wherein said computer system includes a memory and said processor includes a cache memory associated with and corresponding to address space in said memory, and wherein said coprocessor includes means for transferring data from said cache memory to said memory prior to transferring said microcode image from said coprocessor to said processor.

16. Apparatus for loading a microcode image into a plurality of processors in a computer system, wherein said plurality of processors executes a plurality of tasks, comprising:

means for suspending execution of said plurality of tasks by said first one of said plurality of processors at a respective plurality of states;

means for transferring said microcode image into said first one of said plurality of processors;

means for resuming execution of said plurality of tasks by said first processor at said respective plurality of states;

means for suspending execution of said plurality of tasks by said second one of said plurality of processors at a further respective plurality of states;

means for transferring said microcode image into said second one of said plurality of processors, and means for resuming execution of said plurality of tasks by said second processor at said further respective plurality of states.

17. Apparatus for loading a microcode image into a plurality of processors in a computer system according to claim 16, wherein said computer system includes an operating system for receiving said request to load microcode into said plurality of processors and for transmitting at least one signal to said plurality of processors to suspend execution of said plurality of tasks.

18. Apparatus for loading a microcode image into a plurality of processors in a computer system according to claim 16, further comprising coprocessor means in which said microcode image is stored, said coprocessor including means for transferring said microcode image from said coprocessor to each of said plurality of processors after each of said plurality of processors suspends execution of said plurality of tasks.

19. Apparatus for loading a microcode image into a plurality of processors in a computer system according to claim 18, wherein said computer system includes a memory and each of said processors includes a cache memory associated with and corresponding to address space in said memory, one of said plurality of processors comprising means for transferring data from said cache memory of another one of said processors to said memory prior to said console transferring said microcode image to said another one of said processors.

20. Apparatus for loading a microcode image into a plurality of processors in a computer system according to claim 16, wherein two of said plurality of processors includes means for coordinating I/O operations, said apparatus further comprising means for selecting one of said two I/O processors to handle message exchange between said plurality of processors while another of said two I/O processors is receiving said microcode image.

\* \* \* \* \*